(12) United States Patent
Bottomley et al.

(10) Patent No.: US 11,194,639 B2
(45) Date of Patent: Dec. 7, 2021

(54) EXECUTING SYSTEM CALLS IN ISOLATED ADDRESS SPACE IN OPERATING SYSTEM KERNEL

(71) Applicant: International Business Machines Corporation, Armonk, NY (US)

(72) Inventors: James Bottomley, Bellevue, WA (US); Joel Kelly Nider, Zichron Yaakov (IL); Michael Rapoport, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 16/416,229

(22) Filed: May 19, 2019

(65) Prior Publication Data

US 2020/0364101 A1 Nov. 19, 2020

(51) Int. Cl.
*G06F 9/54* (2006.01)
*G06F 9/30* (2018.01)
*G06F 12/1009* (2016.01)
*G06F 21/62* (2013.01)
*G06F 21/70* (2013.01)

(52) U.S. Cl.
CPC ............ *G06F 9/545* (2013.01); *G06F 9/3004* (2013.01); *G06F 12/1009* (2013.01); *G06F 21/62* (2013.01); *G06F 21/70* (2013.01)

(58) Field of Classification Search
CPC ............ G06F 9/545; G06F 2212/1052; G06F 12/1491; G06F 12/109; G06F 21/6281; G06F 9/30043; G06F 9/3004; G06F 12/145; G06F 21/62; G06F 21/6218; G06F 12/14; G06F 21/70; G06F 9/468
See application file for complete search history.

(56) References Cited

U.S. PATENT DOCUMENTS 7,496,576 B2   2/2009   Bernabeu-Auban et al.
8,627,451 B2   1/2014   Walsh et al.
(Continued)

OTHER PUBLICATIONS

Anonymous: "Kernel page-table isolation—Wikipedia", May 27, 2018 (May 27, 2018), XP055719957, Retrieved from the Internet: URL:https://en.wikipedia.org/w/index.php?title=Kernel_page-table_isolation&oldid=843135702 [retrieved on Aug. 4, 2020].
(Continued)

*Primary Examiner* — Tuan C Dao
(74) *Attorney, Agent, or Firm* — Gregory J Kirsch

(57) ABSTRACT

Embodiments of the present systems and methods may provide additional security mechanisms inside an operating system kernel itself by executing system calls in a dedicated address space to reduce the amount of shared resources that are visible to and thus exploitable by a malicious application. For example, in an embodiment, a method implemented in a computer may comprise a processor, memory accessible by the processor, and computer program instructions stored in the memory and executable by the processor, the method may comprise: when a user process makes a system call, switching to kernel mode and using a system call page table for the user process to execute a system call handler, when the system call handler attempts to access unmapped kernel space memory, generating a page fault, and handling the page fault by determining whether the attempted access to unmapped kernel space memory is allowed.

12 Claims, 3 Drawing Sheets

(56) References Cited

U.S. PATENT DOCUMENTS

| | | | |
|---|---|---|---|
| 8,677,354 | B2 | 3/2014 | Peckham et al. |
| 9,354,977 | B1 | 5/2016 | Backensto et al. |
| 10,019,327 | B1 | 7/2018 | Backensto et al. |
| 10,192,067 | B2 | 1/2019 | Gefflaut et al. |
| 2011/0047613 | A1 | 2/2011 | Walsh et al. |
| 2012/0005445 | A1* | 1/2012 | Escandell ............ G06F 12/023 711/170 |
| 2012/0017213 | A1 | 1/2012 | Hunt et al. |
| 2013/0185720 | A1* | 7/2013 | Tuch .................... G06F 12/023 718/1 |
| 2014/0149677 | A1* | 5/2014 | Jayasena ................. G06F 9/52 711/137 |
| 2015/0033227 | A1* | 1/2015 | Lin .................... G06F 9/45558 718/1 |
| 2015/0220354 | A1* | 8/2015 | Nair ................... G06F 12/0868 710/301 |
| 2016/0092678 | A1* | 3/2016 | Probert .............. G06F 12/1458 713/193 |
| 2017/0344731 | A1 | 11/2017 | Gefflaut et al. |
| 2018/0150232 | A1* | 5/2018 | Tsirkin ............... G06F 9/45558 |
| 2019/0243776 | A1* | 8/2019 | Amit ................... G06F 12/1036 |
| 2020/0012456 | A1* | 1/2020 | Tomar .................. G06F 3/0662 |

OTHER PUBLICATIONS

Gens David et al: "Lazarus: Practical Side-Channel Resilient Kernel-Space Randomization", Oct. 12, 2017 (Oct. 12, 2017), Annual International Conference on the Theory and Applications of Cryptographic Techniques, Eurocrypt 2018; [Lecture Notes in Computer Science; Lect. Notes Computer], Springer, Berlin, Heidelberg, pp. 238-258, XP047450508, ISBN: 978-3-642-17318-9 [retrieved on Oct. 12, 2017].

Anonymous: "Page fault—Wikipedia", May 2, 2019 (May 2, 2019), XP055720270, Retrieved from the Internet: URL: https://en.wikipedia.org/w/index.php?title=Page fault&oldid=895110042 [retrieved on Aug. 5, 2020].

The International Search Report and the Written Opinion of the International Searching Authority, dated Aug. 12, 2020, in corresponding PCT Application No. PCT/EP2020/063618.

\* cited by examiner

EXECUTING SYSTEM CALLS IN ISOLATED ADDRESS SPACE IN OPERATING SYSTEM KERNEL

BACKGROUND

The present invention relates to techniques that provide additional security mechanisms inside an operating system kernel itself by executing system calls in a dedicated address space to reduce the amount of shared resources that are visible to and thus exploitable by a malicious application.

System calls are a significant part of the kernel application binary interface (ABI) of an operating system, such as Linux, that is exposed to the user space applications. When a system call is executed, the CPU transitions from an unprivileged mode, such as Ring-3 on x86, to the super-user mode, such as Ring-0 on x86, and the routines invoked during the system call execution have the highest privilege level and thus the ability to access and modify system resources. A malicious user-space application can exploit a vulnerability in the system call implementation to get access to these system resources and cause a crash of the system, read sensitive information, or gain super-user privileges.

Micro-kernels avoid wide exposure of the privileged state by minimizing the amount of the code that runs in the super-user mode and executing most of the operating system services with user privileges in isolated address spaces. The major drawbacks of the micro-kernel approach is the performance cost associated with inter-process communications and the complexity of the interfaces between various components of the system.

As the mitigation of the Meltdown vulnerability, the Page Table Isolation (PTI) mechanism that completely isolates user and kernel address spaces was added to the Linux kernel. However, even with PTI, the entire kernel code shares the same address space and an exploit in any system call handler renders the entire system vulnerable.

Accordingly, a need arises for techniques that provide additional security mechanisms inside an operating system kernel itself.

SUMMARY

Embodiments of the present systems and methods may provide additional security mechanisms inside an operating system kernel itself by executing system calls in a dedicated address space to reduce the amount of shared resources that are visible to and thus exploitable by a malicious application.

In embodiments, when a user-space application performs a system call, the kernel entry code may select an address space suitable for execution of that particular system call. If the execution of the system call tries to access memory outside of that address space, a page fault occurs. The page fault handler may verify whether the requested memory range is allowed to be accessed by the system call handler routine and, if it is, may add this range to the dedicated address space. Upon the completion of the system call, the address space definition may be restored to the original.

For example, in an embodiment, a method implemented in a computer may comprise a processor, memory accessible by the processor, and computer program instructions stored in the memory and executable by the processor, and the method may comprise: when a user process makes a system call, switching to kernel mode and using a system call page table for the user process to execute a system call handler, when the system call handler attempts to access unmapped kernel space memory, generating a page fault, and handling the page fault by determining whether the attempted access to unmapped kernel space memory is allowed.

In embodiments, the computer system operating system may be the Linux operating system. The system call page table may comprise a plurality of kernel-space address ranges allowing execution of kernel code and access to kernel data. The system call page table may be created by: creating a template system call page table comprising mappings of kernel code and data required to perform the entry to the kernel mode upon execution of a system call, a table with the pointers to a system call handlers, and an entry code of each system call handler, creating a copy of the template system call page table for the user process in a process state representation when the user process is created and populating the per-process entry page table with user-space mappings along with the original template, and when a page fault is determined to be allowed, adding a mapping of a kernel-space address range allowing execution of the system call handler that attempted to access kernel-space memory. The method may further comprise when a page fault is determined not to be allowed, terminating execution of the user process that made the system call that attempted to access kernel-space memory. The method may further comprise when execution of the system call handler ends, removing the mapping of the kernel-space address range added during execution of the system call handler.

In an embodiment, a system may comprise a processor, memory accessible by the processor, and computer program instructions stored in the memory and executable by the processor to perform: when a user process makes a system call, switching to kernel mode and using a system call page table for the user process to execute a system call handler, when the system call handler attempts to access unmapped kernel space memory, generating a page fault, and handling the page fault by determining whether the attempted access to unmapped kernel space memory is allowed.

In an embodiment, a computer program product may comprise a non-transitory computer readable storage medium having program instructions embodied therewith, the program instructions executable by a computer, to cause the computer to perform a method that may comprise: when a user process makes a system call, switching to kernel mode and using a system call page table for the user process to execute a system call handler, when the system call handler attempts to access unmapped kernel space memory, generating a page fault, and handling the page fault by determining whether the attempted access to unmapped kernel space memory is allowed.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide additional security mechanisms inside an operating system kernel itself by executing system calls in a dedicated address space to reduce the amount of shared resources that are visible to and thus exploitable by a malicious application. A conventional monolithic operating system kernel, such as the Linux kernel, which runs code in only a single address space may be modified to run code in multiple address spaces for increased security. Additional properties may be used to enhance security. For example, in a system call environment, code in multiple address spaces may run in kernel (privileged) mode, which may be used to ensure that if an entity executing a system call attempts an access outside its allowed address space, the attempted access may be detected and handled securely. The address spaces may be created per user process and may be used to enforce security properties on the user process.

In embodiments, when a user-space application performs a system call, the kernel entry code may select an address space suitable for execution of that particular system call. If the execution of the system call tries to access memory outside of that address space, a page fault occurs. The page fault handler may verify whether the requested memory range is allowed to be accessed by the system call handler routine and, if it is, may add this range to the dedicated address space. Upon the completion of the system call, the address space definition may be restored to the original.

Figure 1:
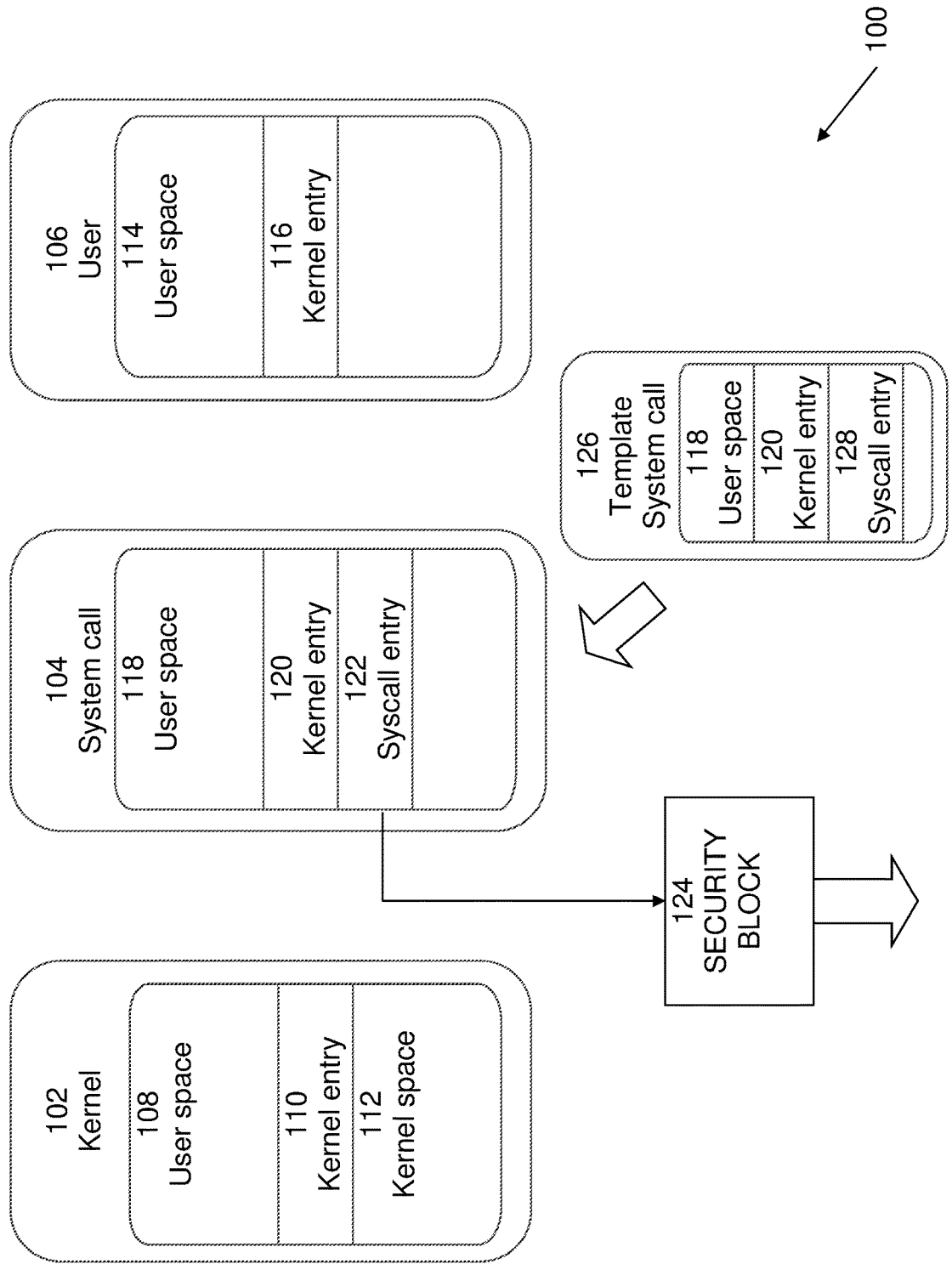
FIG. 1 is an exemplary diagram of system memory space, according to embodiments of the present systems and methods.

An exemplary diagram of system memory space 100 is shown in FIG. 1. This example illustrates a kernel page table 102, a system call page table 104, and a user page table 106. In addition, there may be a template system call page table 126, described below. In this example, kernel page table 102 may be associated with a particular user process and may include user space entries 108, kernel entry page table 110, and kernel space entries 112. User space entries 108 may include user-space address mappings for use when the system is running in kernel (privileged) mode. Kernel space entries 112 may include kernel-space address mappings for use when the system is running in kernel (privileged) mode. Kernel entry page table 110 may include a CPU entry area that maps structures necessary to perform the switch from unprivileged to kernel (privileged) mode. User page table 106 may be associated with a particular user-space process and user-space entries 114 may only include user-space mappings used by the user-space process. Kernel entry page table 116 may include a CPU entry area that maps structures necessary to perform the switch from unprivileged to kernel (privileged) mode. This separation of page tables including kernel entry page tables 110, 116, and 120 may mitigate security vulnerabilities.

A user process normally runs in unprivileged mode and has access to user page table 106 including only user-space entries 114 and kernel entry page table 116. Previously, when a user process made a system call, the system would switch from unprivileged to kernel (privileged) mode and the process would have access to the entire kernel page table including user space entries 108, kernel entry page table 110, and kernel space entries 112. However, in embodiments of the present systems and methods, when a user process makes a system call, the system may switch from unprivileged to kernel (privileged) mode and the process may have access to system call page table 104. System call page table 104 may expand the user process visible mappings with an additional system call (syscall) entry page table 122. Syscall entry page table 122 may allow a user process access to limited kernel-space address ranges to execute a limited additional portion of code or access to data after a switch from unprivileged to kernel (privileged) mode. Syscall entry page table 122 may provide access to a portion of code that is limited enough to prevent malicious access to kernel code and data, yet provides access to more code than is accessible from user-space entries 118. When code is accessed through syscall entry page table 122, security code block 124 may verify that any accesses made are safe. In embodiments, any of a variety of verifications may be performed by security code block 124. For example, in embodiments, security code block 124 may verify that accesses are made only to known symbols.

Figure 2:
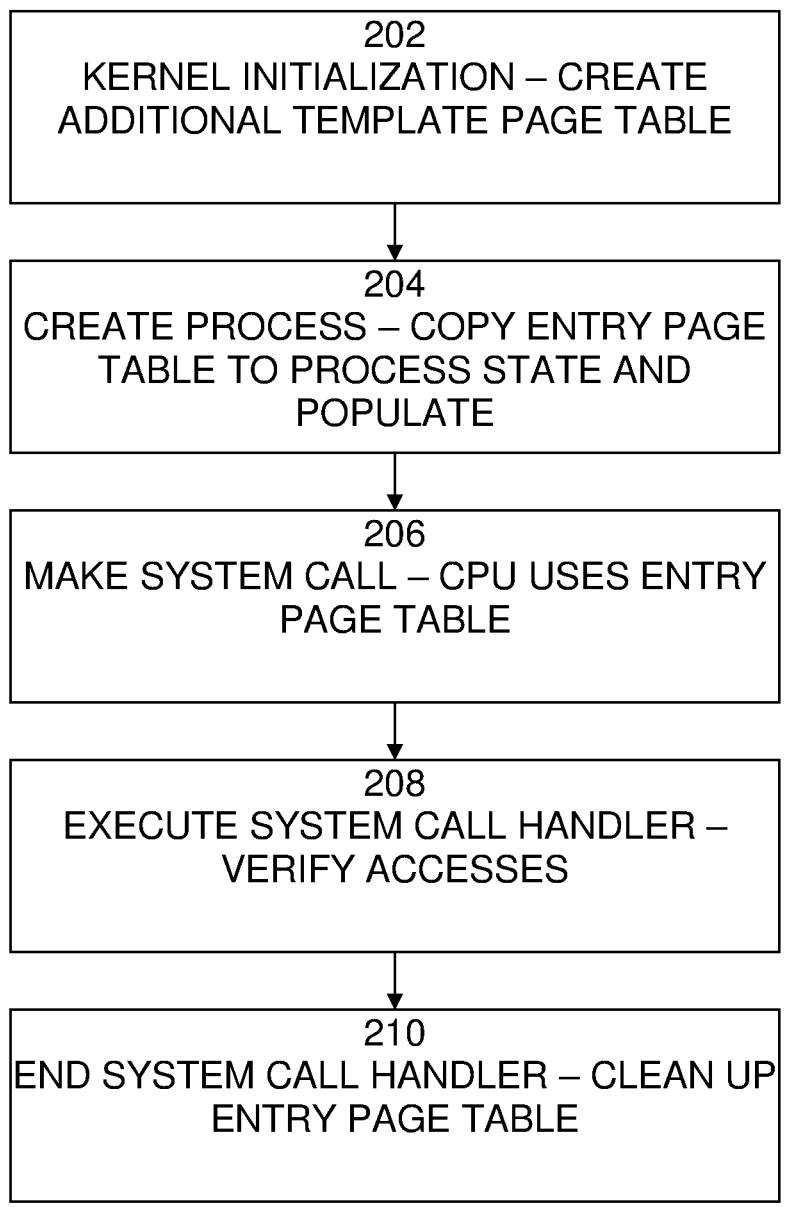
FIG. 2 is an exemplary flow diagram of a process of operation of embodiments of the present systems and methods.

An exemplary flow diagram of a process of operation 200 of embodiments of the present systems and methods is shown in FIG. 2. It is best viewed in conjunction with FIG. 1. Process 200 begins with 202, in which, during the Linux kernel initialization, an additional template system call page table 126, shown in FIG. 3, may be created. The template system call page table 126 may be used to create a functional system call page table 104 for execution of the system call handlers in an isolated address space. The template system call page table 126 may have mappings 128 of the kernel code and data that are required to perform the entry to the kernel (privileged) mode upon execution of a system call, the table with the pointers to the system call handlers, and the entry code of each system call handler in syscall entry page table 122. In addition, template system call page table 126 may have a populated kernel entry page table 120 and an empty user-space page table 118.

At 204, when a process is created, the template system call page table 126 may be copied to the process state representation to form an operational system call page table 104. In addition to the original template including populated kernel entry page table 120 and syscall entry page table 122, the empty user-space page table 118 of the per-process system call page table 104 may be populated with user-space mappings in the same way as the normal process page table.

At 206, a user-space process may execute a system call. The CPU may transition to the kernel (privileged) mode and may invoke a generic system call entry routine. This routing may switch the CPU page table pointer register to use the system call page table 104 for that process, and may jump to a particular system call handler.

At 208, during the execution of the system call handler, any access to the kernel-space kernel code and/or data, may cause a page fault. The page fault handler of security block 124 may verify whether the requested memory access is safe or allowed. If the access if found to be safe or allowed, a mapping of the requested memory range may be added to the per-process system call page table 104. If the access is considered unsafe or not allowed, the user-space process may be terminated and/or other security action may be taken.

At 210, when the execution of the system call handler ends, control may be transferred back to the generic system call entry routine. This routine may clean up the per-process system call page table 104 and may remove the mappings added during the execution of the system call handler.

Figure 3:
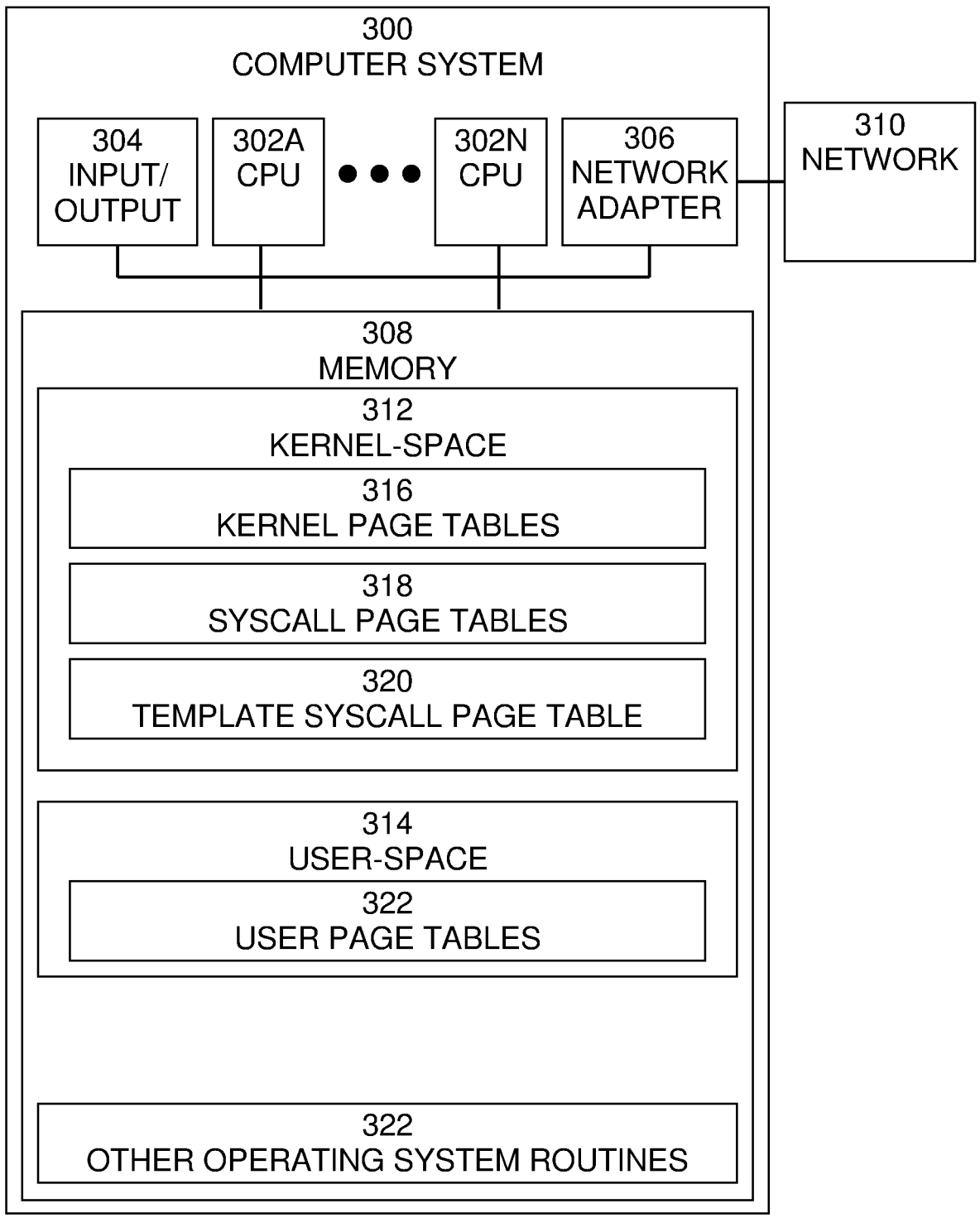
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 3, memory 308 may include kernel-space 312, user-space 314, security block routines 324, and other operating system routines 322. Kernel-space 312 may include code and data that resides in an elevated system state, and which may include a protected memory space and full access to the hardware. Kernel-space 312 may include kernel page tables 316, system call (syscall) page tables 318, and template system call page table 320. Kernel page tables 316 may be associated with a particular user process and may include user space page table 108, kernel entry page table 110, and kernel space page table 112, as shown in FIG. 1 and described above. System call page tables 318 may expand the user process visible mappings with an additional syscall entry page table 122, shown in FIG. 1 and described above. Template system call page table 320 may be used to create a functional system call page table 104 for execution of the system call handlers in an isolated address space, as described above. User-space 314 may include user applications, programs, tasks, processes, etc., which may execute with reduced privileges, in which they can access only a subset of the available resources of the hardware and software. User-space 314 may include user page tables 322, which may map to user-space unprivileged accesses. Security block routines 324 may verify that any accesses made using system call page tables 318 are safe or allowed. Other operating system routines 322 may provide additional system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer comprising a processor, memory accessible by the processor, and computer program instructions stored in the memory and executable by the processor, the method comprising:
   when a user process makes a system call, switching to kernel mode and using a system call page table for the user process to execute a system call handler;
   when the system call handler attempts to access unmapped kernel space memory, generating a page fault; and
   handling the page fault by determining whether the attempted access to unmapped kernel space memory is allowed;
   wherein the system call page table comprises a plurality of kernel-space address ranges allowing execution of kernel code and access to kernel data, and wherein the system call page table is created by:
   creating a template system call page table comprising mappings of kernel code and data required to perform the entry to the kernel mode upon execution of a system call, a table with the pointers to a system call handlers, and an entry code of each system call handler;

creating a copy of the template system call page table for the user process in a process state representation when the user process is created and populating the per-process entry page table with user-space mappings along with the original template; and when a page fault is determined to be allowed, adding a mapping of a kernel-space address range allowing execution of the system call handler that attempted to access kernel-space memory.

2. The method of claim 1, wherein the computer system operating system is the Linux operating system.

3. The method of claim 2, further comprising:

when a page fault is determined not to be allowed, terminating execution of the user process that made the system call that attempted to access kernel-space memory.

4. The method of claim 3, further comprising:

when execution of the system call handler ends, removing the mapping of the kernel-space address range added during execution of the system call handler.

5. A system comprising a processor, memory accessible by the processor, and computer program instructions stored in the memory and executable by the processor to perform:

when a user process makes a system call, switching to kernel mode and using a system call page table for the user process to execute a system call handler;

when the system call handler attempts to access unmapped kernel space memory, generating a page fault; and handling the page fault by determining whether the attempted access to unmapped kernel space memory is allowed;

wherein the system call page table comprises a plurality of kernel-space address ranges allowing execution of kernel code and access to kernel data, and wherein the system call page table is created by:

creating a template system call page table comprising mappings of kernel code and data required to perform the entry to the kernel mode upon execution of a system call, a table with the pointers to a system call handlers, and an entry code of each system call handler;

creating a copy of the template system call page table for the user process in a process state representation when the user process is created and populating the per-process entry page table with user-space mappings along with the original template; and when a page fault is determined to be allowed, adding a mapping of a kernel-space address range allowing execution of the system call handler that attempted to access kernel-space memory.

6. The system of claim 5, wherein the computer system operating system is the Linux operating system.

7. The system of claim 6, further comprising:

when a page fault is determined not to be allowed, terminating execution of the user process that made the system call that attempted to access kernel-space memory.

8. The system of claim 7, further comprising:

when execution of the system call handler ends, removing the mapping of the kernel-space address range added during execution of the system call handler.

9. A computer program product comprising a non-transitory computer readable storage medium having program instructions embodied therewith, the program instructions executable by a computer, to cause the computer to perform a method comprising:

when a user process makes a system call, switching to kernel mode and using a system call page table for the user process to execute a system call handler;

when the system call handler attempts to access unmapped kernel space memory, generating a page fault; and handling the page fault by determining whether the attempted access to unmapped kernel space memory is allowed;

wherein the system call page table comprises a plurality of kernel-space address ranges allowing execution of kernel code and access to kernel data, and wherein the system call page table is created by:

creating a template system call page table comprising mappings of kernel code and data required to perform the entry to the kernel mode upon execution of a system call, a table with the pointers to a system call handlers, and an entry code of each system call handler;

creating a copy of the template system call page table for the user process in a process state representation when the user process is created and populating the per-process entry page table with user-space mappings along with the original template; and when a page fault is determined to be allowed, adding a mapping of a kernel-space address range allowing execution of the system call handler that attempted to access kernel-space memory.

10. The computer program product of claim 9, wherein the computer system operating system is the Linux operating system.

11. The computer program product of claim 10, further comprising:

when a page fault is determined not to be allowed, terminating execution of the user process that made the system call that attempted to access kernel-space memory.

12. The m computer program product of claim 11, further comprising:

when execution of the system call handler ends, removing the mapping of the kernel-space address range added during execution of the system call handler.

* * * * *